United States Patent
Mochizuku et al.

[15] 3,653,210
[45] Apr. 4, 1972

[54] SERVOMOTOR DEVICE FOR BRAKING

[72] Inventors: Toyoju Mochizuku, 5-10, 7-chome Roppongi; Mamoru Watanabe, 16-9, 6-chome Takinozava, both of Tokyo, Japan

[22] Filed: Mar. 16, 1970

[21] Appl. No.: 19,838

[30] Foreign Application Priority Data

Mar. 15, 1969 Japan..................................44/19335

[52] U.S. Cl. ....................60/54.5 P, 60/54.6 P, 60/54.5 HA, 91/414, 188/360
[51] Int. Cl. .........................................................F15b 7/00
[58] Field of Search...........................60/54.5 P, 54.5 E, 52 B; 303/6, 13; 188/360

[56] References Cited

UNITED STATES PATENTS

| | | | |
|---|---|---|---|
| 3,173,261 | 3/1965 | Chouings | 60/54.5 E |
| 3,214,914 | 11/1965 | Kling | 60/54.6 E |
| 3,208,223 | 9/1965 | Watanabe | 60/54.5 E |

Primary Examiner—Edgar W. Geoghegan
Assistant Examiner—A. M. Zupcic
Attorney—Waters, Roditi, Schwartz & Nissen

[57] ABSTRACT

A servomotor device for braking comprises two servo units connected so that their respective outputs may be added, one of the servo units being related to a first relay cylinder with a relay piston having a large effective pressure area and the other servo unit being related to a second relay cylinder with a relay piston having a small effective pressure area, whereby only one servo unit is operated at the early stage of stepping down on a brake pedal, and thereafter both of the servo units are put into operation.

3 Claims, 4 Drawing Figures

SERVOMOTOR DEVICE FOR BRAKING

BRIEF SUMMARY OF THE INVENTION

This invention relates to a servomotor device adapted to be utilized as a power-assisted brake for a car.

In intensifying devices for braking cars, it is required, for improving braking characteristics, to start the operation of a servomotor as soon as possible when hydraulic pressure in a master cylinder has begun to increase and to make as gentle as possible the slope of the hydraulic pressure characteristic curve for an intensifying cylinder driven by the servomotor. However, in conventional devices of this type it is disadvantageous that the slope of such a hydraulic pressure characteristic curve becomes less gentle in those having servomotors which start when the hydraulic pressure in the master cylinders is low, while those having gentle slopes of pressure characteristic curves have the disadvantage that servomotors do not start until the hydraulic pressure in such master cylinders is increased to a certain level.

A primary object of this invention is to provide a servomotor device for braking, which permits the starting of a servomotor with low hydraulic pressure in a master cylinder and making gentle the slope of the hydraulic pressure characteristic in intensifying cylinders, thereby to improve the braking characteristics in brakes for vehicles.

In accordance with this invention a servomotor is composed of two servo units so connected that their respective outputs may be added, one of which servo units has a first relay cylinder with a relay piston having a large effective pressure area and the other has a second relay cylinder with a relay piston having a small effective pressure area. Thus, at the initial stage of stepping down on a brake pedal, one servo unit only is operated to drive and advance a piston in a pressure intensifying cylinder and, thereafter, both of the servo units are operated together to further drive and advance the piston in the intensifying cylinder, when the input hydraulic pressure in the intensifying cylinder, i.e., the output hydraulic pressure in the master cylinder has been increased to a predetermined level. In this manner, the hydraulic pressure characteristic curve for the intensifying cylinder can be made as shown in FIG. 4 by curve C.

DETAILED DESCRIPTION

Figure 1:
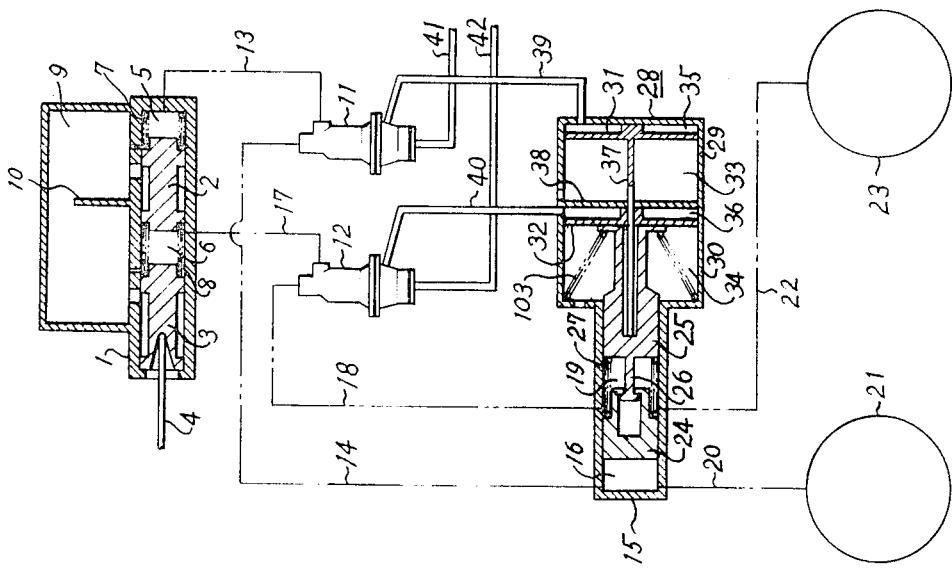
FIG. 1 is a diagrammatic illustration of a servomotor device for braking arranged in and connected to a two-system car braking device.

Referring now to the drawing, one embodiment of this invention will be described, with reference to a two-system car braking device. In FIG. 1, reference numeral 1 represents a tandem master cylinder having a first piston 2 and a second piston 3. The second piston 3 is driven by a push rod 4 connected to a brake pedal (not shown).

In front of the pistons 2 and 3 are first and second hydraulic pressure chambers 5 and 6 with return springs 7 and 8 respectively mounted therein. Above the tandem master cylinder 1 is a reservoir 9 which is divided into two parts by a partition 10. Reference numerals 11 and 12 represent first and second valve structures, each composed of a hydraulic pressure control valve, a relay cylinder, and an air pressure controller, as will be hereinafter described. The first hydraulic pressure chamber 5 in the tandem master cylinder 1 is connected to the first valve structure 11 through a hydraulic pressure line 13 and is further connected, through a hydraulic pressure line 14, to a first pressure intensifying chamber 16 in a pressure intensifying cylinder 15. Likewise, the second hydraulic pressure chamber 6 is connected to the second valve structure 12 through a hydraulic pressure line 17, and is further connected, through a hydraulic pressure line 18, to a second pressure intensifying chamber 19 in the pressure intensifying cylinder 15. The first pressure intensifying chamber 16 is connected to a wheel brake 21 through a hydraulic pressure line 20, while the second pressure intensifying chamber 19 is connected to a wheel brake 23 through a hydraulic pressure line 22. In the pressure intensifying cylinder 15 are first and second intensifying pistons 24 and 25 which are normally urged in opposite directions by the action of a spring 27. An engaging member 26 on piston 25 serves to limit the spacing between the pistons 24 and 25. At the side of the second pressure intensifying chamber 19 of the pressure intensifying cylinder 15 there is connected a servomotor 28, which is formed of first and second servo units 29 and 30. The servo units 29 and 30 contain reciprocating members 31 and 32, air pressure chambers 33 and 34 communicating with the atmosphere, and air pressure chambers 35 and 36 connected to high-pressure sources (not shown) such as air compressors and the like. The reciprocating member 31 in the first servo unit 29 is fixed to a push rod 37 which is free to slide and is inserted through a partition 38 and the reciprocating member 32 until it strikes the second intensifying piston 25. The reciprocating member 32 in the second servo unit 30 is abutted against the second intensifying piston 25. Consequently, outputs from the first and second servo units 29 and 30 are applied to the second intensifying piston 25 in such a manner as to be added without being affected by each other during their operation. Reference numeral 103 represents a return spring. The air pressure chambers 35 and 36 in the servo units 29 and 30 are connected to the valve structures 11 and 12 through pneumatic pressure lines 39 and 40 and further to the high-pressure sources through pneumatic pressure lines 41 and 42, respectively.

Figure 2:
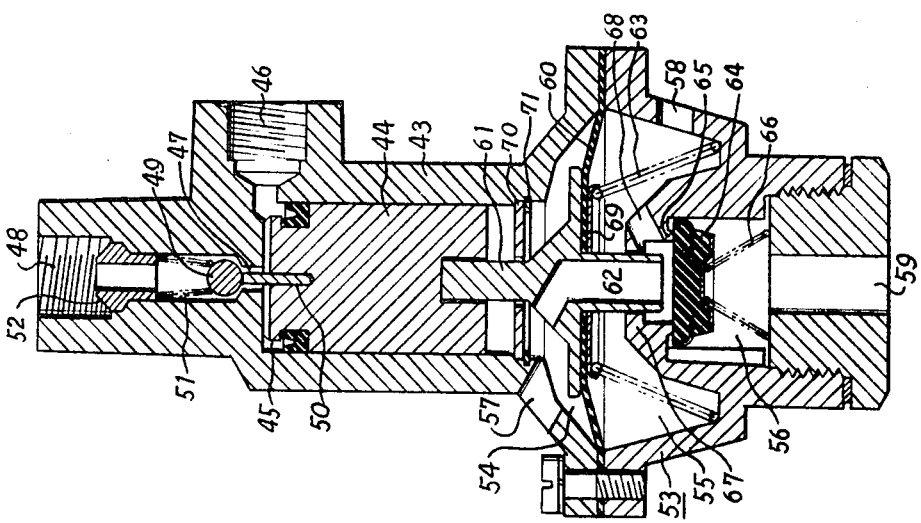
FIG. 2 is a cross-sectional view of a first valve structure in which a first relay cylinder and a first air pressure controller are incorporated.

The first valve structure 11 is shown in detail in FIG. 2. A first relay cylinder 43 thereof receives a relay piston 44 having a large effective pressure area, over which a hydraulic pressure chamber 45 is formed. The hydraulic pressure chamber 45 is connected to the hydraulic pressure line 13 at a connecting port 46, and to the hydraulic pressure line 14 through a passage 47 and a connecting port 48. The passage 47 is closed with a ball valve 49. When the relay piston 44 is not in operation, the ball valve 49 is pushed up against a spring 51 by means of an operating rod 50 fixed to the relay piston 44, to thereby open the passage 47. When the relay piston 44 is in operation, the ball valve 49 is released from the operating rod 50 to close the passage 47 by the action of the spring 51. This ball valve 49 acts as a hydraulic pressure control valve for the pressure intensifying cylinder 15.

A first air pressure controller 53 for the first servo unit is formed under the relay piston 44. The first pneumatic pressure controller 53 has two low-air pressure chambers 54 and 55 and one high-air pressure chamber 56, the low-air pressure chamber 54 communicating with the atmosphere through an air hole 57, the low-air pressure chamber 55 being connected to the air pressure tube 39 at a connecting port 58, and the high-air pressure chamber 56 being connected to the pneumatic pressure line 41 at a connecting port 59. The low-air pressure chambers 54 and 55 are separated by a diaphragm 60 and communicate with each other through a passage 62 in a push rod 61 fixed on the diaphragm 60. The push rod 61 and the diaphragm 60 are pushed up by a spring 63 until the upper end of the push rod 61 reaches the relay piston 44. The low-air pressure chamber 55 is separated from the high-air pressure chamber 56 by a poppet valve 64 pressed against and in contact with the surface of a valve seat 65. 66 represents a spring urging the poppet valve 64 against the surface of the valve seat 65, and numeral 67 represents a guide for the push rod 61. Numeral 68 denotes an air hole, 69 a spring retainer, 70 a stopper for the relay piston 44, and 71 a clip for fixing the stopper 70.

Figure 3:
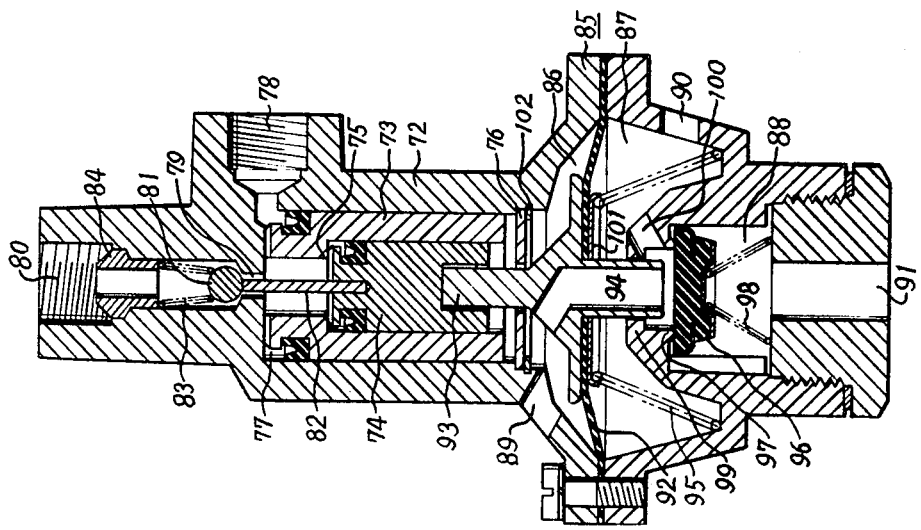
FIG. 3 is a cross-sectional view of a second valve structure in which a second relay cylinder and a second air pressure controller are incorporated.

FIG. 3 shows the second valve structure 12 which is the same as the first valve structure 11, except for a second relay cylinder 72, which has a piston 73 for closing the ball valve and a relay piston 74 having a small effective pressure area. The piston 73 for closing the ball valve is a hollow cylindrical body which has a shoulder 75 on its inner wall. The outer diameter of the piston 73 for closing the ball valve is equal to that of the relay piston 44 in the first valve structure. The relay piston 74 is inserted in the piston 73 so as to be free to slide therein and stop at the shoulder 75. The lower end of the piston 73 is nearer to the stopper 76 than the lower end of the relay piston 74.

The remaining structure in FIG. 3 is the same as that in FIG. 2 and will be given hereafter without detailed description. Reference numeral 77 represents a hydraulic pressure chamber, 78 a connecting port, 79 a passage, 80 a connecting port, 81 a ball valve acting as a hydraulic pressure control valve, 82 an operating rod, 83 a spring, 84 a spring retainer, 85 a second air-pressure controller, 86 and 87 low-air pressure chambers, 88 a high-air pressure chamber, 89 an air hole, 90 and 91 connecting ports, 92 a diaphragm, 93 a push rod, 94 a passage, 95 a spring, 96 a poppet valve, 97 the surface of a set, 98 a spring, 99 a guide, 100 an air hole, 101 a spring bearing, and 102 a clip.

Without stepping down on the brake pedal, the first and second valve structures 11 and 12 are in the state shown in FIGS. 2 and 3. The ball valves 49 and 81 open the passages 47 and 79 through which working fluid may be supplied from the reservoir 9 to any point in the hydraulic pressure system. On the other hand, the poppet valves 64 and 96 are pressed against and in contact with the valve seat surfaces 65 and 97 with the passages 62 and 94 being kept open. Accordingly, the low-air pressure chambers 54 and 86 communicate with the low-air pressure chambers 55 and 87, while the low-air pressure chambers 54, 55, 86 and 87 are disconnected from the high-air pressure chambers 56 and 88. Thus, the pneumatic pressure chambers 35 and 36 in the servo units 29 and 30 communicate with the atmosphere, respectively, whereby both servo units 29 and 30 are not operated.

When the driver has depressed the brake pedal, hydraulic pressure in the first and second hydraulic pressure chambers 5 and 6 in the tandem master cylinder 1 starts to increase, and is applied to the hydraulic pressure chamber 45 in the first valve structure 11 and to the hydraulic pressure chamber 77 in the second valve structure 12. The relay piston 44 in the first valve structure starts to move down, thus thrusting the push rod 61 downwardly against the opposition of spring 63. With the relay piston 44 moving downwardly, the ball valve 49 is released from the operating rod 50, with the resulting closing of the passage 47. Hydraulic pressure in the chamber 77 in the second valve structure is transmitted to the relay piston 74 via the shoulder 75 and, consequently, the piston 73 and the relay piston 74 start to move down together. As a result of downward movement of the pistons 73 and 74, the ball valve 81 is released from the operating rod 82 to close the passage 79. The sum of the effective pressure areas of the piston 73 for closing the ball valve and the relay piston 74 is equal to the effective pressure are of the relay piston 44 and, therefore, the ball valves 49 and 81 close their respective passages at the same time. If the closing time is out of synchronism, hydraulic pressure intensified by the cylinder 15 leaks out into the master cylinder 1. This results in a loss of efficiency.

After the piston 73 has reached the stopper 76 in the second valve structure, only the relay piston 74 keeps pushing the push rod 93 downwardly. The distance between the lower end of the piston 73 and the stopper 76 is so determined as to be long enough to make the operating rod 82 leave the ball valve 81.

Figure 4:
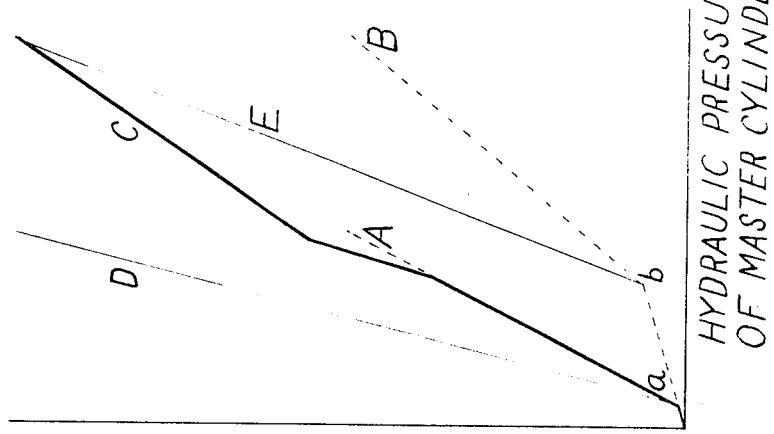
FIG. 4 graphically shows the hydraulic pressure characteristics of the intensifying cylinder driven by the servomotor device for braking according to this invention.

The relay piston 44 and 74 keep moving further down and the relay piston 44, which has an effective pressure area larger than that of the relay piston 74, will travel further down than the relay piston 74. Thus, the passage 62 is first cut off when the lower end of the push rod 61 has reached the poppet valve 64, and then the poppet valve 64 is separated from the valve seat 65 when pushed down against the spring 66 by the push rod 61. As a result, the low-air pressure chamber 55 is disconnected from the low-air pressure chamber 54 and is placed into communication with the high-air pressure chamber 56. As the low-air pressure chamber 55 communicates with the air pressure chamber 35 in the first servo unit 29, pneumatic pressure in the chamber 35 starts to increase, and a differential pneumatic pressure is produced between the pneumatic pressure chambers 35 and 33. Consequently, the reciprocating member 31 is moved forwardly. At this time the second servo unit 30 is not yet operated, and only the reciprocating member 31 drives the second and first intensifying pistons 25 and 24. In FIG. 4, point a indicates the time when the first servo unit starts to operate.

The time when the low-air pressure chamber 87 is disconnected from the low-air pressure chamber 86 and is then placed in communication with the high-air pressure chamber 88 in the second pneumatic pressure controller 85 is delayed. Thus, the time when the second servo unit 30 starts to operate is indicated by point b in FIG. 4.

Generally speaking, the larger the effective pressure area of the relay piston, the sharper the slope of the hydraulic pressure characteristic curve for a pressure intensifying cylinder. Accordingly, a hydraulic pressure characteristic curve obtained by use of the first servo unit 29 only, be indicated at A (dotted line) in FIG. 4, while such a characteristic curve obtained by use of the second servo unit 30 only, is indicated at B (dotted line). Thus, a hydraulic pressure characteristic curve for the pressure intensifying cylinder 15 is as shown at C by a thick solid line in FIG. 4, which is obtained by adding A to B. Here, D (fine solid line) shows the hydraulic pressure characteristic with the relay piston 74 having an effective pressure area equal to that of the relay piston 44, while E (fine solid line) shows the hydraulic pressure characteristic with the relay piston 44 having an effective pressure area equal to that of the relay piston 74. As will be clear from FIG. 4, the characteristic curve C is less sharp than the characteristic curve D, and furthermore, the hydraulic pressure in the master cylinder at the time when the servomotor starts to operate is lower, as compared with the characteristic curve E.

It is to be understood that this invention is not limited to the embodiment as shown in the accompanying drawing. By using hydraulic pressure control valves instead of the ball valves 49 and 81 in the first and second intensifying pistons 24 and 25, the piston 73 for closing the ball valve in the second relay cylinder 72 may be eliminated, and the inner diameter of the second relay cylinder 72 may be made smaller. This invention may also be applied to one-system braking devices.

What is claimed is:

1. A servomotor device for operation with a master cylinder for a braking operation, said servomotor device comprising a servomotor including two servo units connected so that their outputs are additive, first and second relay cylinders each including a relay piston operated by hydraulic pressure applied by the master cylinder, a first pneumatic pressure controller driven by the relay piston in the first relay cylinder to control one of the servo units, and a second pneumatic pressure controller driven by the relay piston in the second relay cylinder to control the other servo unit, the relay piston in the first relay cylinder having an effective pressure area larger than that of the relay piston in the second relay cylinder, each servo unit having a pressure intensifying chamber, said servomotor device further including two hydraulic pressure control valves to control the flow of working fluid between the master cylinder and a respective pressure intensifying cylinder and to apply hydraulic pressure in synchronization to said intensifying cylinders, one hydraulic pressure control valve being integrally connected with the first relay cylinder, and the other control valve being integrally connected with the second relay cylinder.

2. A servomotor device for braking as claimed in claim 1, in which said hydraulic pressure control valves are constructed to be closed and opened when the relay pistons in the relay cylinders associated therewith are moved forward and returned respectively under the pressure in the master cylinder.

3. A servomotor device as claimed in claim 2, wherein said relay cylinders define hydraulic pressure chambers behind the relay pistons in the respective relay cylinders, means connecting the chambers to the master cylinder, passages connecting said hydraulic pressure chambers with the pressure intensifying cylinders, spring-loaded ball valves in said relay cylinders urged in a direction to close said passages, operating rods on the relay pistons facing the ball valves and normally engaged therewith to hold the same open, said operating rods leaving the ball valves when the relay pistons move forward under the application of pressure in said master cylinder; a cylindrical piston in the second cylinder for controlling the respective valve and having an outer diameter equal to that of the first relay piston, the second relay piston being slidably mounted in said cylindrical piston so that the cylindrical piston will advance together with the relay piston by hydraulic pressure in the hydraulic pressure chamber in the second relay cylinder until said passages are closed by the ball valve associated with the second relay cylinder.

* * * * *